(12) United States Patent
Angus et al.

(10) Patent No.: US 6,846,034 B1
(45) Date of Patent: Jan. 25, 2005

(54) VEHICULAR WEATHER STRIP

(75) Inventors: Steven Wayne Angus, Novi, MI (US); Matthew Partsch, Livonia, MI (US); Tadeusz J. Siedlecki, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/707,745

(22) Filed: Jan. 8, 2004

(51) Int. Cl.[7] ............................................. B60J 10/00
(52) U.S. Cl. ..................................... 296/146.9; 296/93
(58) Field of Search ............................. 296/154, 146.5, 296/146.7, 146.9, 1.08, 93, 213; 49/502, 377, 490.1, 498.1, 475.1; 52/716.8, 800.13

(56) References Cited

U.S. PATENT DOCUMENTS

| | | | | |
|---|---|---|---|---|
| 5,249,353 A | * | 10/1993 | Kranz | ............................ 29/446 |
| 5,489,104 A | * | 2/1996 | Wolff | ............................ 277/646 |
| 5,545,448 A | * | 8/1996 | Ford et al. | ..................... 428/31 |
| 5,866,232 A | * | 2/1999 | Gatzmanga | .................. 428/122 |
| 6,623,014 B1 | * | 9/2003 | Martin | ......................... 277/630 |
| 6,623,832 B2 | * | 9/2003 | Greven | ......................... 428/121 |
| 6,677,020 B2 | * | 1/2004 | Dron | ......................... 428/36.91 |
| 2002/0152686 A1 | * | 10/2002 | Whitehead | ................. 49/475.1 |
| 2002/0152687 A1 | * | 10/2002 | Willett | ....................... 49/475.1 |

* cited by examiner

*Primary Examiner*—Patricia L. Engle
(74) *Attorney, Agent, or Firm*—Gigette M. Bejin

(57) ABSTRACT

A weather strip for use between a closure panel and the body of a vehicle includes a foundation bulb extending about the periphery of an opening in the body and a contactor bulb supported entirely by the foundation bulb and having a compliance which is less than the compliance of the foundation bulb such that the configuration of the contactor bulb remains relatively invariant as sidewalls of the foundation bulb deform in response to a compressive load imposed by the closure panel and the body opening panel.

19 Claims, 3 Drawing Sheets

VEHICULAR WEATHER STRIP

BACKGROUND OF INVENTION

1. Field of the Invention

The present invention relates to a weather strip for environmentally sealing a movable closure structure or panel, such as a hinged door, to the body of a vehicle.

2. Disclosure Information

Vehicle designers have used a veritable plethora of configurations and materials for weather stripping. Such materials and configurations have run the gamut from flat leather seals to gas-inflated multi-bulb weather strips. Flat strips, although having the advantage of being robust and easy to apply, are plagued by leaks and high door closing efforts. Additionally, flat weather strips, being relatively noncompliant, have little dimensional range, and are therefore intolerant of the dimensional stack-ups usually encountered in vehicular body manufacturing. Multi-bulb weather strips, while accommodating a considerable range of tolerance stack-ups, have been plagued by lack of integrity inasmuch as such weather strips have tended to roll over and thereby cease to function correctly when compressed to more than a very small degree.

The inventors of the present weather strip have devised a multi-bulb weather strip which accommodates a wide range of dimensional tolerance stack-ups, while sealing well and resisting failure resulting from roll over and other failure modes.

SUMMARY OF INVENTION

A weather strip adapted for installation between a closure panel and a body of a vehicle includes a carrier for mounting the weather strip, and a foundation bulb extending laterally across the carrier, with the foundation bulb having an outer wall supported by a plurality of upstanding symmetrical side walls, with the sidewalls being integral with a base which is itself integral with the carrier. The present weather strip further includes a contactor bulb supported entirely by the foundation bulb, with the contactor bulb having a base which is integral with the outer wall of the foundation bulb and which extends laterally across a portion of the foundation bulb's outer wall. The contactor bulb has an outer contact portion for sealingly engaging a portion of a closure panel. The base of the contactor bulb preferably extends across approximately one-third of the outer wall of the foundation bulb. The outer wall of the foundation bulb and the outer contact portion of the contactor bulb are preferably generally convex when the weather strip is not loaded.

According to another aspect of the present invention, the compliance of the foundation bulb in response to a normally directed load is greater than the compliance of the contactor bulb resulting from such load. The foundation bulb is configured such that the sealing force asserted by the weather strip is generally invariant over a predetermined range of compression distances.

According to another aspect of the present invention, the foundation bulb, the contactor bulb, and the carrier are simultaneously extruded as an integral assembly.

According to another aspect of the present invention, the outer wall of the foundation bulb is supported by a plurality of upstanding symmetrical sidewalls, with each of these sidewalls having a plurality of links and a reduced-thickness region permitting controlled and equal deformation of the sidewalls in response to sealing loads.

It is an advantage of the present invention that the present weather strip will prevent wind and water leaks from vehicular doors in high-volume production situations in which a wide range of door/body clearances must be accommodated.

It is a further advantage of the present invention that the present weather strip will seal without rolling over, even in difficult sealing environments such as those encountered with motor vehicle doors having multi-planar sealing surfaces.

It is a further advantage of the present invention that the present configuration may be used not only in a weather strip, but also as a overslam bumper for motor vehicle doors. Thus, the present invention may be viewed more broadly as a door closure structure.

Other advantages, as well as objects and features of the present invention, will become apparent to the reader of this specification.

DETAILED DESCRIPTION

Figure 1:
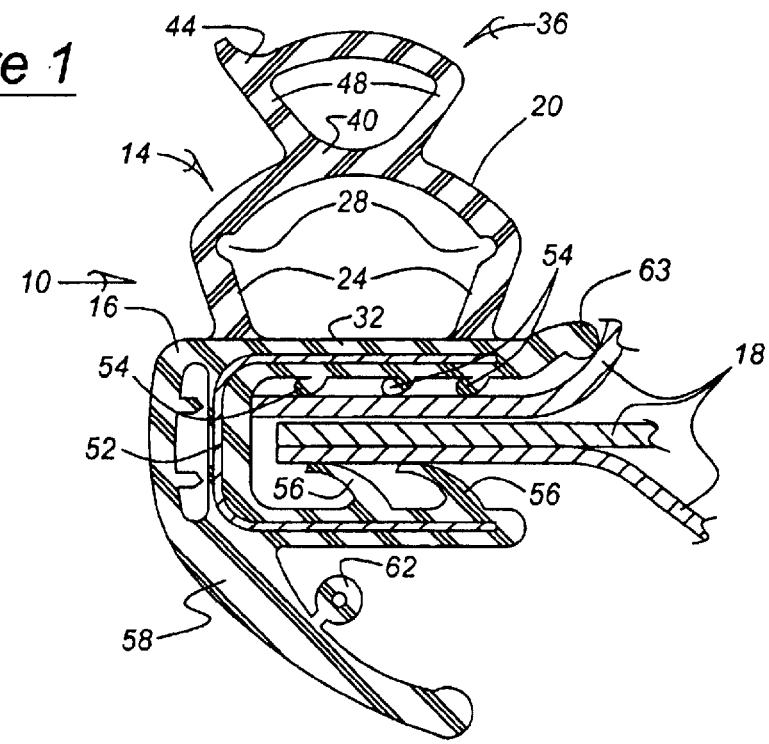
FIG. 1 is a sectional view of a vehicular weather strip according to present invention.

As shown in FIG. 1, a weather strip according to the present invention is of the dual bulb variety in which foundation bulb 14 provides a support structure for a sealing or contactor bulb, 36. Foundation bulb 14 and contactor bulb 36 are purposively named. In the first instance, foundation bulb 14 serves solely to support contactor bulb 36; foundation bulb 14 does not perform the function of contacting any part of a closure panel, such as a door, which is swung into contact with the current weather strip whenever the door is closed. Conversely, contactor bulb 36 is the sole element of the present weather strip which contacts the door when the door is in its closed position. As will become clear in this specification, foundation bulb 14 and contactor bulb 36 are uniquely adapted to perform their relative functions.

Foundation bulb 14, contactor bulb 36, and carrier 16, to which the bulbs are mounted, are preferably extruded from the same die, as is the balance of the present weather strip, from either an elastomeric material such as EPDM, sponge, TPV, or other materials known to those skilled in the art and suggested by this disclosure.

Figure 4:
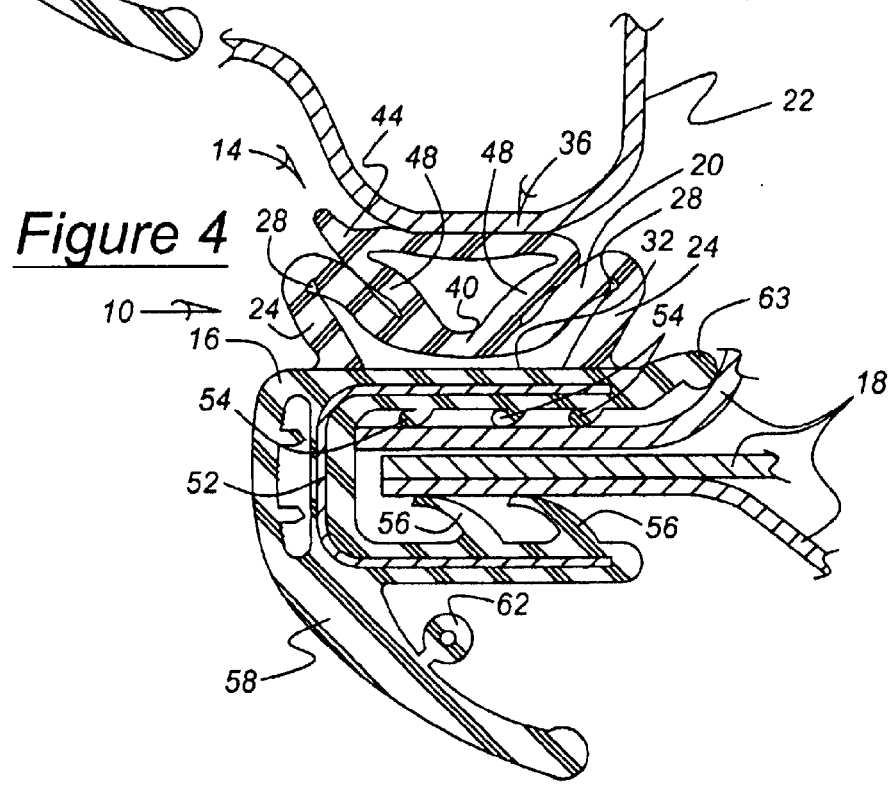
FIG. 4 is similar to FIGS. 1 and 3, but shows a weather strip according to the present invention in a fully loaded condition.

Foundation bulb 14 has a outer wall 20, which functions as a raised support surface for contactor bulb 36. Outer wall 20 is supported by sidewalls 24 which are integral with, and upstanding from, base 32. In turn, base 32 is integral with carrier 16. Each of sidewalls 24 has a reduced thickness region 28 incorporated therein, which promotes compliance of sidewalls 24 in response to loads imposed by a closure panel upon weather strip 10. This compliance is shown in an extreme case in FIG. 4. Even though sidewalls 24 are compliant, their overall stiffness allows foundation bulb 14 to deform in a controlled, symmetrically equal manner, so as to assure that contactor bulb 36 remains in its intended orientation notwithstanding the imposition of loads sufficient to cause large scale deformation of foundation bulb 14, as shown in FIG. 4. An added benefit of the present structure resides in the fact that the present weather strip is more easily conformed to the corners of a door opening panel, as compared with prior art structures.

Figure 3:
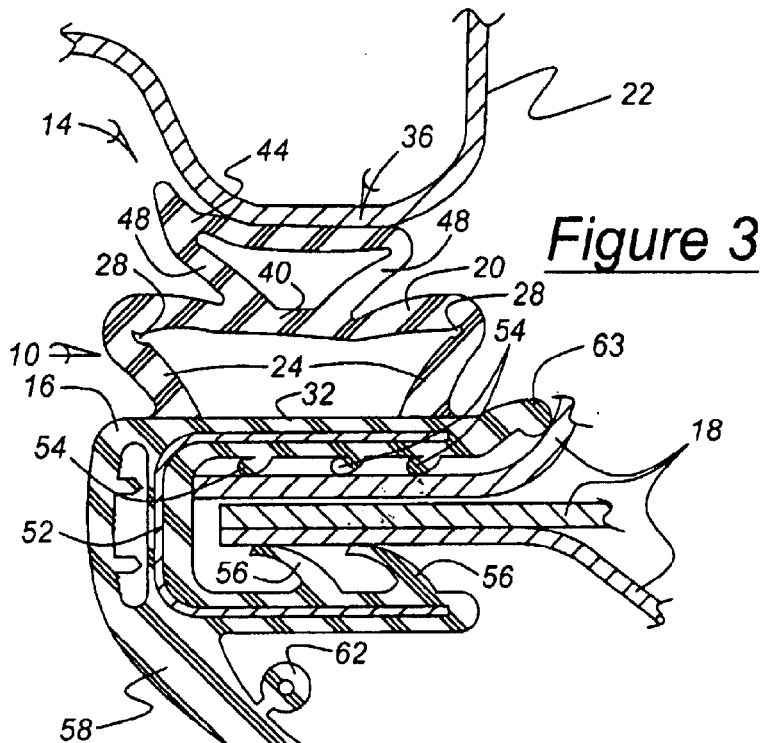
FIG. 3 is a sectional view, similar to FIG. 1, but showing a weather strip according to the present invention in a partially loaded condition.

As shown in FIGS. 1, 3, and 4, carrier 16 is mounted upon door opening panel flange 18 by crimping armature 52 upon flange 18. A plurality of fin seals 54 and 56 is employed for the purpose of sealingly engaging door opening panel flange 18, while simultaneously providing structural mounting of carrier 16. FIG. 1 shows that fin seals 56 have a greater installed height than do fin seals 54. This causes carrier 16 to be offset to the inside of the vehicle, so as to provide for greater travel of seal assembly 10 before the seal becomes fully compressed. Stated another way, fin seals 54 and 56 are arranged such that carrier 16 is offset toward the interior of a vehicle to which weather strip 10 is being attached. This effectively increases the amount of space which is available for weather strip 10.

Auxiliary seal 58 is positioned so as extend from carrier 16 in a direction opposed to the direction of extension of foundation bulb 14 and contactor bulb 36. Auxiliary seal 58 may further have a sacrificial tear bead 62 which allows auxiliary seal lip 58 to be pulled out from behind trim (not shown) during assembly of a vehicle with the current weather strip. In essence, sacrificial tear bead 62 is ripped from auxiliary seal 58 by a production operator as auxiliary seal 58 is pulled into its final at-rest position on door opening panel 18, (FIG. 2), in which seal 58 overlays either a headliner or another trim component (not shown). Frivvet 63, which extends integrally from an outboard portion of carrier 16, is designed to sealingly engage door opening panel flange 18, so as to seal off weld nugget locations in the door opening panel.

Contactor bulb 36 is supported entirely by foundation bulb 14. In the case in which the present weather strip is attached to a closure panel such as a door, contactor bulb 36 will not touch any surface of the closure panel to which weather strip 10 is attached. Conversely, where weather strip 10 is applied to a door opening, contactor bulb 36 will not touch any surface other than the closed door. Stated another way, weather strip 10 will not roll-over to the extent that contactor bulb 36 is allowed to come into contact with the structure to which the weather strip has been applied.

Contactor bulb 36 includes base 40 which is integral with outer wall 20 which, as noted above, comprises a raised support surface for base 40. Side walls 48 are symmetrical and extend from elevated base 40 to outer contact portion 44 of contactor bulb 36. Outer contact portion 44 is form-compliant; this means that outer contact portion 44 will conform itself to a surface with which it is sealingly engaged, whether that surface be a surface incorporated in a closure panel such as a door, or a door opening panel, as where the present weather strip is incorporated within a movable panel.

Figure 2:
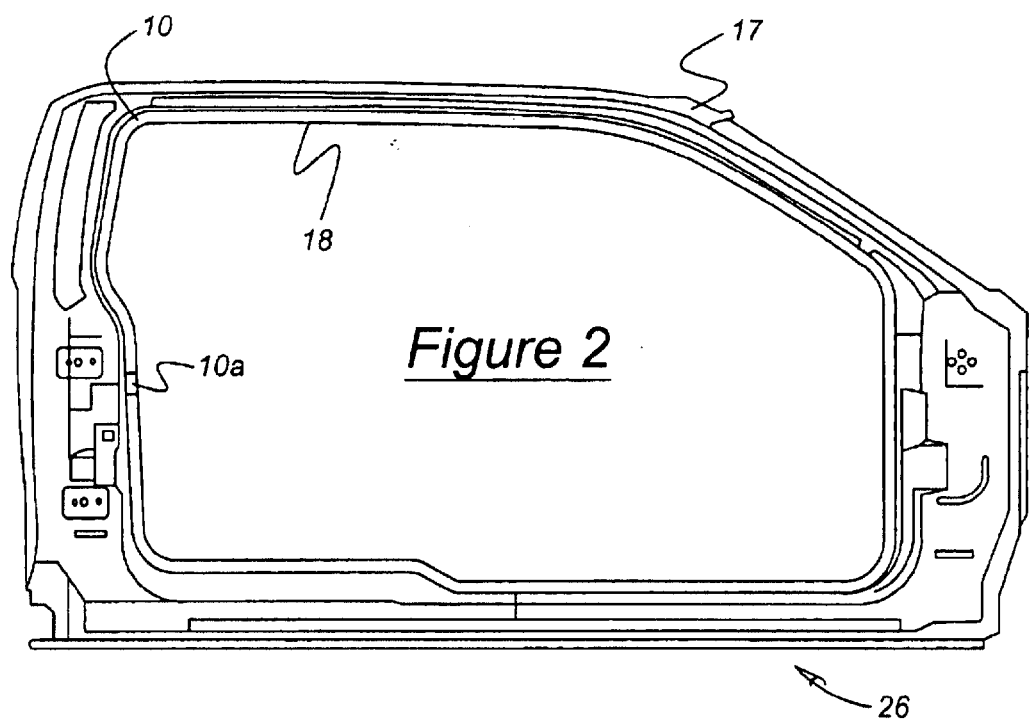
FIG. 2 is a plan view of a vehicle body having a door opening panel with a weather strip applied according to the present invention.

As shown in FIG. 2, vehicle body 26 having door opening panel 17 and door opening panel flange 18, has weather strip 10 applied about door opening panel flange 18. As described above, weather strip 10 is applied to door opening panel flange 18 by crimping carrier 16 with a tool, so as to plastically deform armature 52.

FIG. 3 shows weather strip 10 in a partially loaded state. Door 22 is shown as being sealingly engaged by outer contact portion 44 of contactor bulb 36. Outer contact portion 44 is compliant and elastically deforms to match the contour of door 22 in the contact region. As further shown in FIG. 3, sidewalls 24 of foundation bulb 14 are clearly evidenced as being symmetrically deformable, due in part to the use of multiple links joined by reduced-thickness regions 28. These design features cause side-walls 24 to fold symmetrically at regions 28 in the manner shown in FIGS. 3 and 4, thereby causing contactor bulb 36 to be maintained in a constant orientation as contactor bulb 36 is moved from its at-rest position shown in FIG. 1 to the partially displaced position shown in FIG. 3, and the fully displaced position shown in FIG. 4. FIGS. 3 and 4 further show that the configuration or shape of contactor bulb 36 remains relatively invariant notwithstanding the deflection or deformation imposed upon foundation bulb 14.

Figure 5:
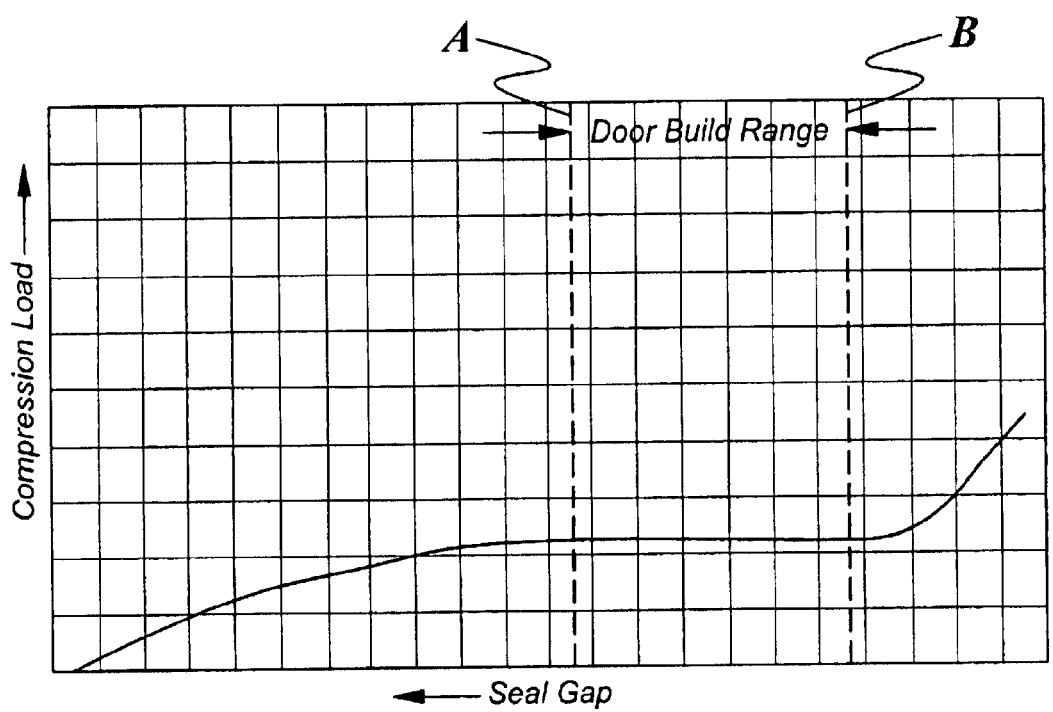
FIG. 5 is a plot illustrating compression load as a function of seal gap for a range of seal gap dimensions.

FIG. 5 shows weather strip compression load as a function of the gap distance between for example, a closed door and a mating vehicle surface. The gap range extending between vertical markers "A" and "B", which corresponds to a door build range for production vehicles, corresponds to the condition of weather strip 10 shown in FIGS. 3 and 4. It should be noted that the compressive load remains relatively invariant within the "build range" of dimensions. This decided advantage, as compared with prior art structures, results at least in part from the folding configuration of sidewalls 24, which allows a range of gaps to be successfully sealed.

FIG. 4 shows weather strip 10 in a fully loaded state. As with FIG. 3, door 22 is shown as being sealingly engaged by outer contact portion 44. FIG. 4 further shows that the configuration or shape of contactor bulb 36 renders it very stable, even when it is severely deflected. Also, the orientation of contactor bulb 36 with respect to foundation bulb 14 remains relatively invariant notwithstanding the relatively large deflection or deformation imposed upon foundation bulb 14. This allows contactor bulb 36 to remain sealingly engaged with contactor portion 44 of door 22 without rolling over.

Weather strip 10 may be used not only as a door closure structure for sealingly engaging substantially the entire periphery of a closure panel, but also as a discrete overslam bumper which resilient engages only a portion of a closure panel. This is shown at 10a of FIG. 2.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A weather strip adapted for installation between a closure panel and a body of a vehicle, comprising:
   a carrier for mounting the weather strip;
   a foundation bulb extending laterally across said carrier, with said foundation bulb having an outer wall supported by a plurality of upstanding symmetrical sidewalls with said sidewalls being integral with a base which is itself integral with said carrier; and
   a contactor bulb supported entirely by said foundation bulb, with said contactor bulb having a base which is integral with said outer wall of said foundation bulb and which extends laterally across a portion of said outer wall of said foundation bulb, with said contactor bulb having an outer contact portion for sealingly engaging at least a portion of a closure panel.

2. A weather strip according to claim 1, wherein said base of said contactor bulb extends across approximately one-third of said outer wall of said foundation bulb.

3. A weather strip according to claim 1, wherein said outer wall of said foundation bulb is generally convex when said weather strip is not loaded.

4. A weather strip according to claim 1, wherein said outer contact portion of said contactor bulb is generally convex when said weather strip is not loaded.

5. A weather strip according to claim 1, wherein the compliance of said foundation bulb in response to a normally directed load is greater than the compliance of said contactor bulb resulting from said load.

6. A weather strip according to claim 1, wherein the sealing force exerted by said weather strip is generally invariant over a predetermined range of compression distances.

7. A weather strip according to claim 1, wherein said carrier, said foundation bulb, and said contactor bulb are extruded simultaneously as an integral assembly.

8. A weather strip adapted for installation between a closure panel and a body of a vehicle, comprising:
 a carrier for mounting said weather strip about the periphery of a door opening in a body of a vehicle;
 a foundation bulb extending laterally across at least a portion of said carrier, with said foundation bulb extending outwardly from said carrier, and with said foundation bulb having an outer wall supported by a plurality of upstanding symmetrical sidewalls mounted to a base, with said base being integral with said carrier; and
 a contactor bulb supported entirely by said foundation bulb, with said contactor bulb having an elevated base which is integral with said outer wall of said foundation bulb and which extends laterally across a portion of said outer wall of said foundation bulb, with said contactor bulb having a form-compliant outer contact portion supported by symmetrical sidewalls extending from said elevated base, with said outer contact portion being adapted to sealingly engage a portion of a closure panel, and with said sidewalls of said foundation bulb being more compliant than said sidewalls of said contactor bulb, such that the configuration of said contactor bulb will remain relatively invariant as said sidewalls of said foundation bulb deform in response to a load imposed by a closure panel and body opening panel.

9. A weather strip according to claim 8, wherein only said form-compliant outer contact portion of said contactor bulb is adapted to engage a closure panel which is closed against said weather strip.

10. A weather strip according to claim 8, wherein said carrier comprises a U-shaped armature having an extruded cover comprising said foundation bulb and said contactor bulb.

11. A weather strip according to claim 10, wherein said carrier further comprises a plurality of fin seals for engaging and positioning said carrier upon a flange of said door opening panel.

12. A weather strip according to claim 11, wherein said fin seals being arranged such that said carrier is adapted to be offset toward the interior of a vehicle to which said weather strip is attached.

13. A weather strip according to claim 10, further comprising an auxiliary seal extending from said carrier in a direction opposed to the direction of extension of said foundation bulb and said contactor bulb, with said auxiliary seal having a sacrificial tear bead for positioning said auxiliary seal during installation of said weather strip.

14. A sealing system for a vehicle, comprising: an opening panel incorporated within a vehicle;
 a closure panel adapted to cooperate with said opening panel to enclose a portion of the vehicle; and
 a weather strip attached to a base panel comprising a first one of said opening panel and said closure panel, with said weather strip comprising:
 a non-contacting foundation bulb attached to said base panel, with said foundation bulb having an outer wall comprising a raised support surface supported by compliant, symmetrical sidewalls; and
 a contactor bulb formed integrally with, and extending from, said raised support surface, with said contactor bulb being supported entirely by said foundation bulb, and with said contactor bulb having a form-compliant outer contact portion for engaging a sealing surface comprising a portion of a second one of said opening panel and said closure panel.

15. A sealing system according to claim 14, wherein said raised support surface of said foundation bulb is supported by said compliant, symmetrical sidewalls such that a sealing load imposed upon said form-compliant outer contact portion of said contactor bulb will cause said foundation bulb sidewalls to deform equally, while not changing the configuration of said contactor bulb, so as to allow said form-compliant outer contact portion of said contactor bulb to remain in contact with said second one of said opening panel and said closure panel.

16. A sealing system according to claim 15, wherein each of said sidewalls supporting said raised support surface of said foundation bulb is generally convex.

17. A sealing system according to claim 15, wherein each of said sidewalls supporting said raised support surface comprises a plurality of links, each having a reduced-thickness region to permit controlled and equal deformation in response to sealing loads.

18. A door closure structure adapted for installation between a closure panel and a body of a vehicle, comprising:
 a carrier for mounting the door closure structure;
 a foundation bulb extending laterally across said carrier, with said foundation bulb having an outer wall supported by a plurality of upstanding symmetrical sidewalls with said sidewalls being integral with a base which is itself integral with said carrier; and
 a contactor bulb supported entirely by said foundation bulb, with said contactor bulb having a base which is integral with said outer wall of said foundation bulb and which extends laterally across a portion of said outer wall of said foundation bulb, with said contactor bulb having an outer contact portion for engaging a portion of a closure panel.

19. A door closure structure according to claim 18, with said structure being adapted to be mounted upon a door opening panel, for sealingly engaging substantially the entire periphery of a closure panel.

* * * * *